US008430609B2

(12) United States Patent
Frejd

(10) Patent No.: US 8,430,609 B2
(45) Date of Patent: Apr. 30, 2013

(54) TOOL, TOOL BODY AND CUTTING HEAD

(75) Inventor: Stefan Frejd, Söderköping (SE)

(73) Assignee: Seco Tools AB, Fagersta (SE)

( * ) Notice: Subject to any disclaimer, the term of this patent is extended or adjusted under 35 U.S.C. 154(b) by 1051 days.

(21) Appl. No.: 12/423,031

(22) Filed: Apr. 14, 2009

(65) Prior Publication Data

US 2010/0021253 A1 Jan. 28, 2010

(30) Foreign Application Priority Data

Apr. 14, 2008 (SE) ........................................ 0800834

(51) Int. Cl.
*B23B 51/02* (2006.01)

(52) U.S. Cl.
USPC ............................ 408/231; 408/226; 408/713

(58) Field of Classification Search .................. 408/144, 408/226–227, 230, 231–233, 713; *B23B 51/00, B23B 51/02*
See application file for complete search history.

(56) References Cited

U.S. PATENT DOCUMENTS 3,548,688 A * 12/1970 Kuch ............................ 408/230
5,971,673 A 10/1999 Berglund et al.
5,988,953 A 11/1999 Berglund et al.
6,109,841 A * 8/2000 Johne ............................ 408/144
6,506,003 B1 * 1/2003 Erickson ........................ 408/226
6,840,717 B2 * 1/2005 Eriksson ........................ 408/1 R
7,309,196 B2 * 12/2007 Ruy Frota de Souza ..... 408/227
7,407,350 B2 * 8/2008 Hecht et al. .................... 408/231
7,467,915 B2 * 12/2008 Ruy Frota de Souza ..... 408/231
7,625,161 B1 * 12/2009 Ruy Frota de Souza ..... 408/227
7,972,094 B2 * 7/2011 Men et al. ...................... 408/231
8,021,088 B2 * 9/2011 Hecht ............................ 408/231
2005/0084352 A1 * 4/2005 Borschert et al. ............. 408/226

FOREIGN PATENT DOCUMENTS

WO WO 2008014367 A1 * 1/2008
WO WO 2008072840 A2 * 6/2008

* cited by examiner

*Primary Examiner* — Daniel Howell
(74) *Attorney, Agent, or Firm* — WRB-IP LLP

(57) ABSTRACT

A tool for rotary cutting machining includes a tool body and a replaceable cutting head detachably attachable to the tool body. The cutting head has a coupling portion which is receivable in a space between two axially projecting coupling legs of the tool body. Cylindrical internal gripping surfaces are arranged in said space and designed for engagement with corresponding cylindrical external gripping surfaces of the cutting head. The gripping surfaces of the cutting head and the gripping surfaces of the tool body are dimensioned so as to prevent, by engagement with each other, the cutting head from being displaced in axial direction away from the tool body when the cutting head is attached to the tool body. A tool body and a cutting head included in such a tool are also disclosed.

14 Claims, 4 Drawing Sheets

40 30 1 32 14 13a 13b 12 10 18 18 C1 11

30
35a
48
36a
38
39b
41
42
43
43
36b
39a
32
42
40
41

43
40
41
42
41
30
32
35a
48
36a
39a
38
37b
37a
43
44
45

39b
38
30
35a
32
37b
48
36a
37a
43
36b
35b
43
44
45
38

TOOL, TOOL BODY AND CUTTING HEAD

BACKGROUND AND SUMMARY

The present invention relates to a tool for rotary cutting machining with a tool body and a replaceable cutting head detachably attachable to the tool body. The invention also relates to a tool body and a cutting head included in such a tool.

U.S. Pat. No. 5,988,953 A and U.S. Pat. No. 5,971,673 A disclose a known tool, wherein the mutual gripping surfaces of the tool body and the cutting head are conical and widen in the direction towards the rear end of the tool body and the cutting head, respectively, so as to thereby achieve a positive locking in axial direction between the tool body and the cutting head. This positive locking prevents the cutting head from being displaced in axial direction away from the tool body, for instance when the tool is pulled out of a bore drilled by means of the tool. A disadvantage with these conical gripping surfaces is that the tolerance requirements are high for these surfaces and that they are relatively complicated to achieve by means of mechanical machining.

It is desirable to achieve a tool of the type mentioned by way of introduction with a new and favourable design.

In a tool according to an aspect of the invention, the cutting head is prevented from being displaced in axial direction away from the tool body by means of the mutual engagement between the internal gripping surfaces of the tool body and the corresponding external gripping surfaces of the cutting head, the gripping surfaces of the tool body being cylindrical and extending in parallel with the centre axis of the tool body and the gripping surfaces of the cutting head being cylindrical, extending in parallel with the centre axis of the cutting head and having a radius which is larger than the radius of said internal gripping surfaces. The cylindrical external gripping surfaces of the cutting head and the cylindrical internal gripping surfaces of the tool body are dimensioned so as to, by engagement with each other, prevent the cutting head from being displaced in axial direction away from the tool body when the cutting head is attached to the tool body. Consequently, the cutting head is prevented by these cylindrical gripping surfaces from sliding in axial direction away from the tool body, and the cutting head is forced by these cylindrical gripping surfaces to accompany the tool body when the tool body is pulled in axial direction out of a bore drilled by means of the tool. With the solution according to the invention, this axial locking of the cutting head to the tool body is achieved without requiring any conical sections in the mutual gripping surfaces of the tool body and the cutting head or any positive locking in axial direction achieved in any other manner. The coupling portion of the tool body and the coupling portion of the cutting head can thereby be given a shape that is simplified and favourable with respect to the manufacturing of the tool body and the cutting head. Owing to the fact that the gripping surfaces of the tool body are cylindrical and parallel with the centre axis of the tool body, an achievement of these gripping surfaces by mechanical machining of a blank prepared for the formation of a tool body is facilitated, and owing to the fact that the gripping surfaces of the cutting head are cylindrical and parallel with the centre axis of the cutting head, and achievement of these gripping surfaces by mechanical machining of a blank prepared for the formation of a cutting head is facilitated.

According to a favourable embodiment of the invention, a stop surface of a respective coupling leg extends in parallel with the centre axis of the tool body and the corresponding stop surface of the cutting head extends in parallel with the centre axis of the cutting head. By letting the stop surfaces of the tool body be parallel with the centre axis of the tool body, an achievement of these stop surfaces by mechanical machining of a blank prepared for the formation of a tool body is facilitated, and by letting the stop surfaces of the cutting head be parallel with the centre axis of the cutting head, an achievement of these stop surfaces by mechanical machining of a blank prepared for the formation of a cutting head is facilitated.

According to another favourable embodiment of the invention, the internal gripping surfaces of the coupling portion of the tool body are arranged on the inside of a respective one of said coupling legs at the level of the stop surface of the coupling leg, and the external gripping surfaces of the coupling portion of the cutting head are arranged at the level of the stop surfaces of the cutting head. Hereby, the coupling portion of the tool body and the coupling portion of the cutting head can be given a relatively compact design with a comparatively short extension in axial direction.

Other favourable features of the tool according to the invention will appear from the following description.

The invention also relates, according to further aspects thereof, to a tool body and to a cutting head.

Other favourable features of the tool body according to aspects of the invention and the cutting head according to aspects of the invention will appear from the dependent claims and the following description.

BRIEF DESCRIPTION OF THE DRAWINGS

The invention will in the following be more closely described by means of embodiment examples, with reference to the appended drawings. It is shown in.

DETAILED DESCRIPTION

The tool 1 of the invention is intended to be rotated for cutting machining of a workpiece. In the illustrated example, the tool is designed as a twist drill, but the tool of the invention could also be designed as another type of tool for rotary cutting machining, such as for instance a milling cutter or the similar.

The intended direction of rotation of the tool 1 for machining is marked with the arrow R in FIGS. 2, 4 and 11-12. This direction of rotation is in the following denominated "machining direction of rotation" and consequently constitutes the direction in which the tool is intended to be rotated in order to achieve cutting machining of a, preferably metallic, workpiece. Alternatively, the workpiece can be rotated while the tool is kept stationary.

The tool 1 comprises a tool body 10 and a replaceable cutting head 30, which is detachably attachable to the tool body.

The cutting head 30 is formed in a one piece of a suitable cemented carbide, i.e. made of pressed or injection moulded cemented carbide. "Cemented carbide" here refers to WC, TiC, TaC, NbC etc, in sintered combination with a binder metal, such as for instance Co or Ni. The cutting end is preferably at least partially coated with a layer of for instance Al2O3, TiN and/or TiCN. In some cases, it can be suitable to have the cutting edges made of superhard materials, such as CBN or PCD, attached by soldering. The tool body 10 is likewise made in one piece, preferably of steel or other suitable metallic material.

Figure 5:
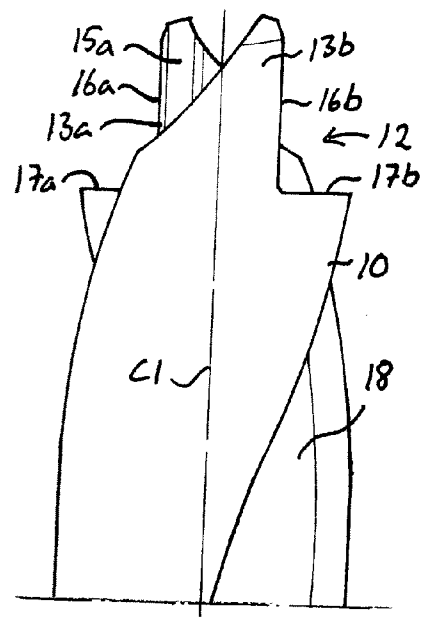

The tool body 10 is symmetrically designed as seen in cross-section. At its rear end, the tool body 10 has an attachment portion 11, through which the tool body is intended to be attached to a chuck or the similar of a drilling machine or another suitable type of working machine. At its front end, the tool body has a coupling portion 12 for receiving a corresponding coupling portion 32 of the cutting head. As appears from FIGS. 5-7, the coupling portion 12 of the tool body is provided with two coupling legs 13*a*, 13*b* projecting in the axial direction of the tool body and arranged on opposite sides of the centre axis C1 of the tool body. Between the coupling legs 13*a*, 13*b* there is a space 14 for receiving the coupling portion 32 of the cutting head. Internal gripping surfaces 15*a*, 15*b* are arranged in this space 14. These internal gripping surfaces are designed for engagement with corresponding external gripping surfaces 35*a*, 35*b* (see FIGS. 8-12) of the coupling portion of the cutting head, as will be more closed described below. In the illustrated example, these gripping surfaces 15*a*, 15*b* are two in number.

Figure 6:
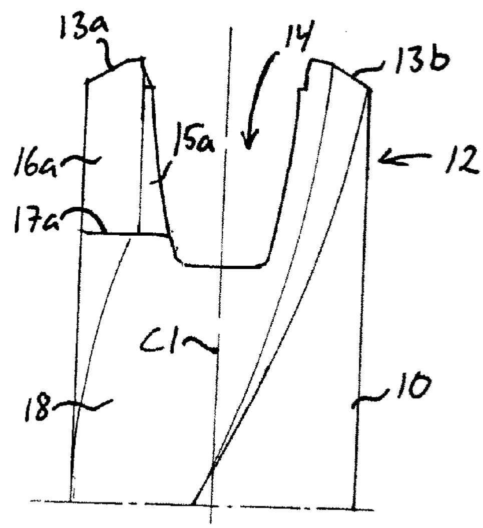
Figure 7:
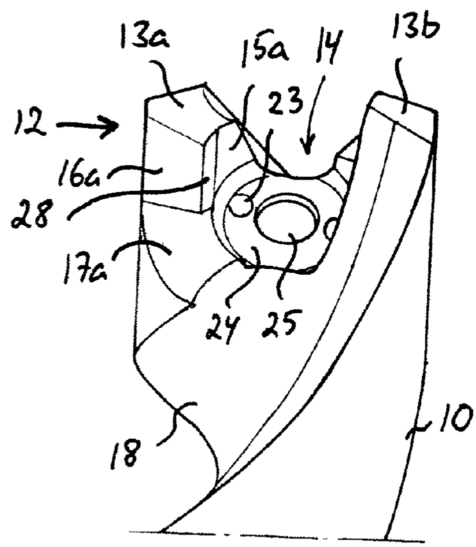

The respective coupling leg 13*a*, 13*b* is provided with a surface 16*a*, 16*b*, here denominated stop surface, which is designed for abutment against a corresponding stop surface 36*a*, 36*b* (see FIGS. 8-12) of the coupling portion of the cutting head in order to transfer torque from the tool body to the cutting head during rotation of the tool in its machining direction of rotation R. The internal gripping surfaces 15*a*, 15*b* of the coupling portion of the tool body are suitably arranged on the inside of a respective one of the coupling legs 13*a*, 13*b* at the level of the stop surface 16*a*, 16*b* of the coupling leg, as illustrated in FIGS. 6 and 7.

In the respective coupling leg 13*a*, 13*b*, the stop surface 16*a*, 16*b* of the coupling leg borders on a support surface 17*a*, 17*b* extending perpendicularly to the centre axis C1 of the tool body. Each one of these support surfaces 17*a*, 17*b* is designed for abutment against a corresponding support surface 37*a*, 37*b* (see FIGS. 9 and 10) of the coupling portion of the cutting head in order to carry axial forces when the cutting head 30 is pressed against a workpiece. The respective stop surface 16*a*, 16*b* of the coupling portion 12 of the tool body is parallel with the centre axis C1 of the tool body, and the stop surface 16*a*, 16*b* consequently extends perpendicularly to the support surface 17*a*, 17*b* bordering thereon.

Figure 1:
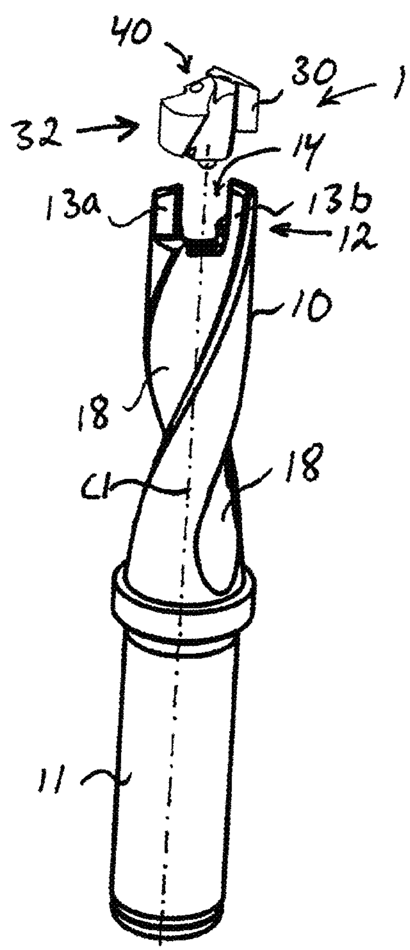
FIG. 1 a perspective view of a cutting head and a tool body included in a tool according to an embodiment of the present invention in the form of a twist drill, with the cutting head and the tool body shown separated from each other, FIG. 2 a perspective view corresponding to FIG. 1, but with the cutting head attached to the tool body.
Figure 2:
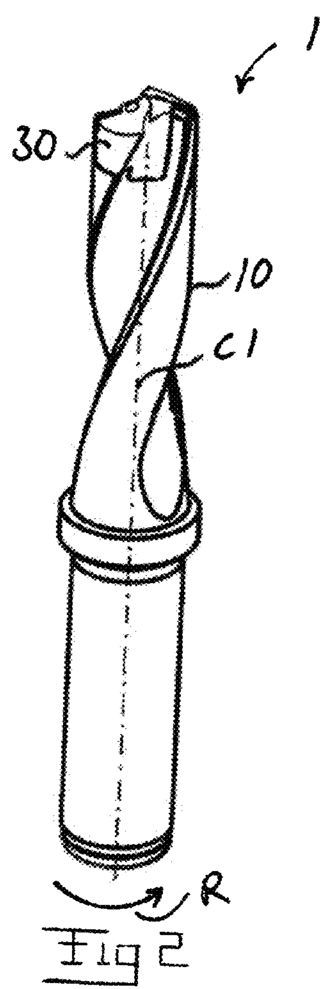
Figure 3:
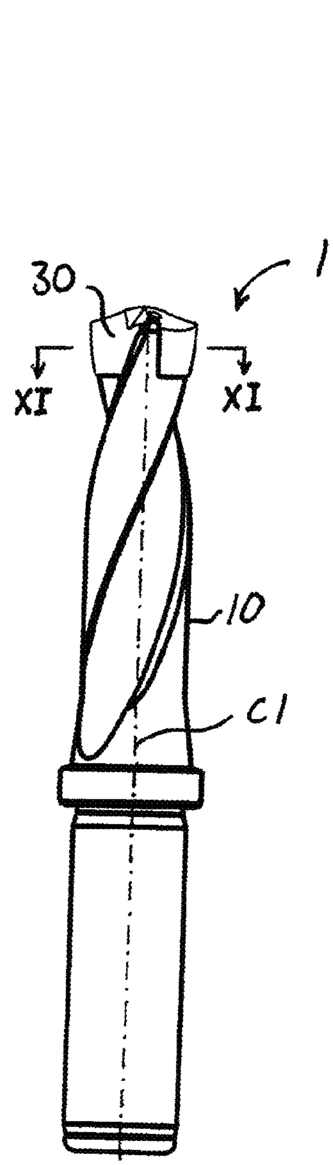
FIG. 3 a lateral view of the tool according to FIG. 2.
Figure 4:
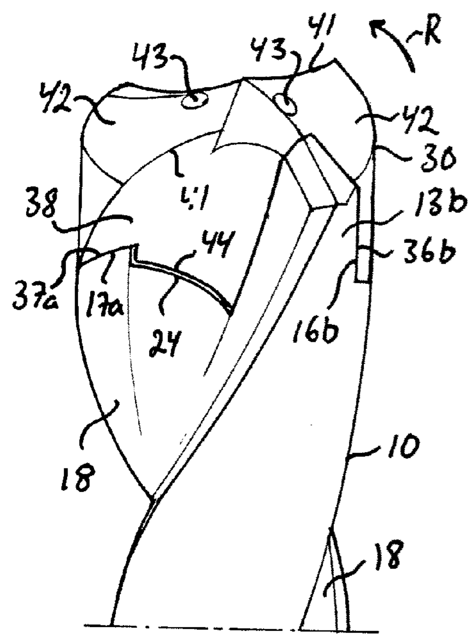
FIG. 4 a perspective view of the front part of the tool according to FIG. 2, FIG. 5 a lateral view in a first rotary position of the front part of the tool body included in the tool according to FIG. 2, FIG. 6 a lateral view in a second rotary position of the front part of the tool body, FIG. 7 a perspective view of the front part of the tool body, FIG. 8 a perspective view from the front of the cutting head included in the tool according to FIG. 2, FIG. 9 a lateral view of the cutting head, FIG. 10 a perspective view from behind of the cutting head, FIG. 11*a* cross-section along the line XI-XI in FIG. 3, with the cutting head shown in an engagement position, and FIG. 12 the cross-section of FIG. 11, with the cutting head shown in a free position.
Figure 8:
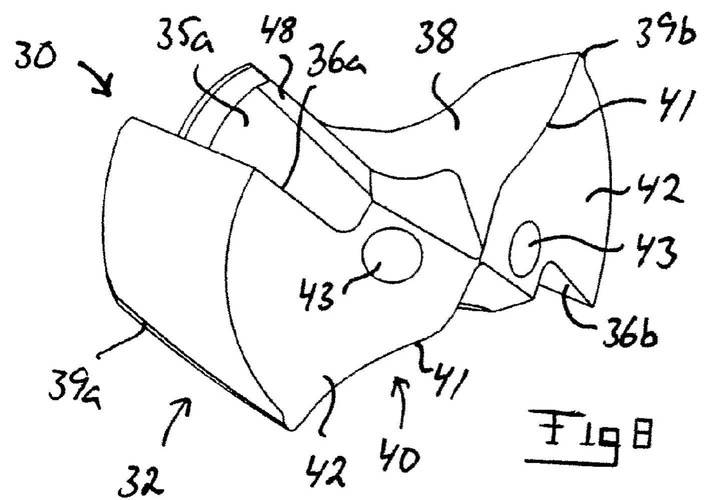
Figure 9:
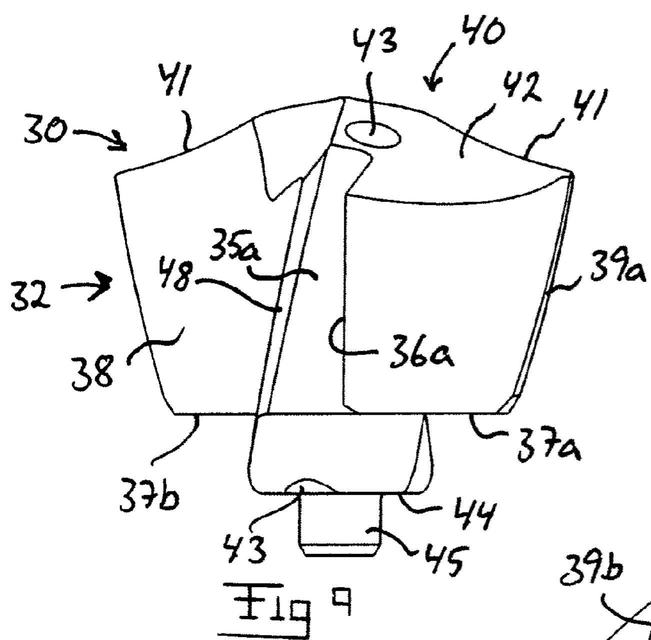
Figure 10:
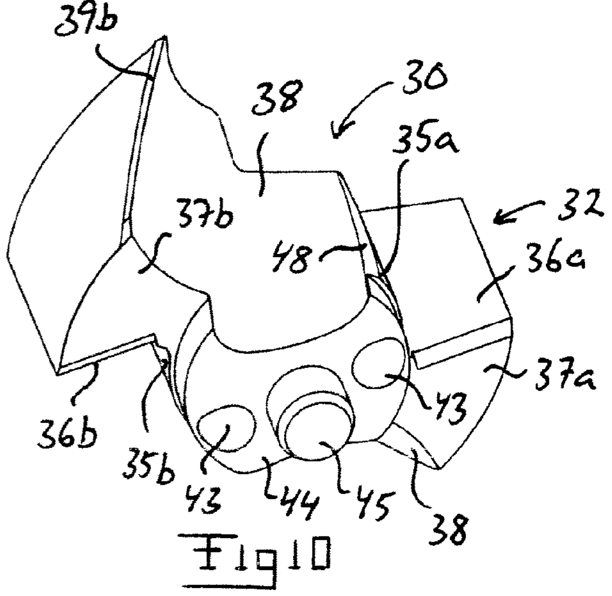
Figure 11:
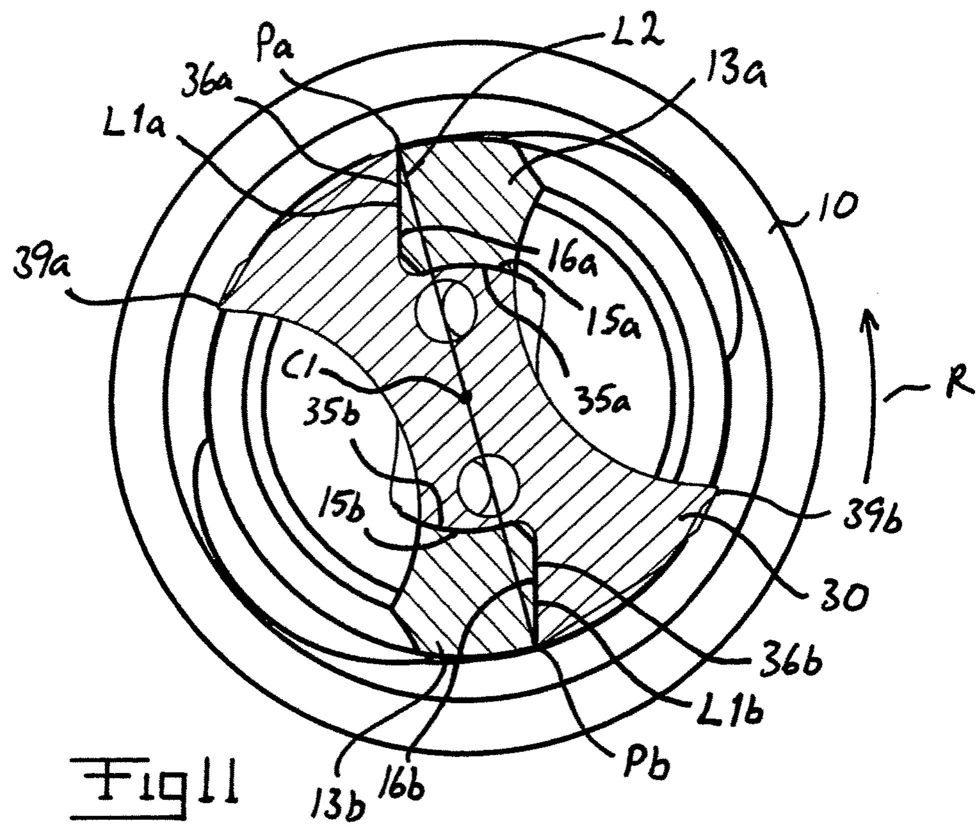
Figure 12:
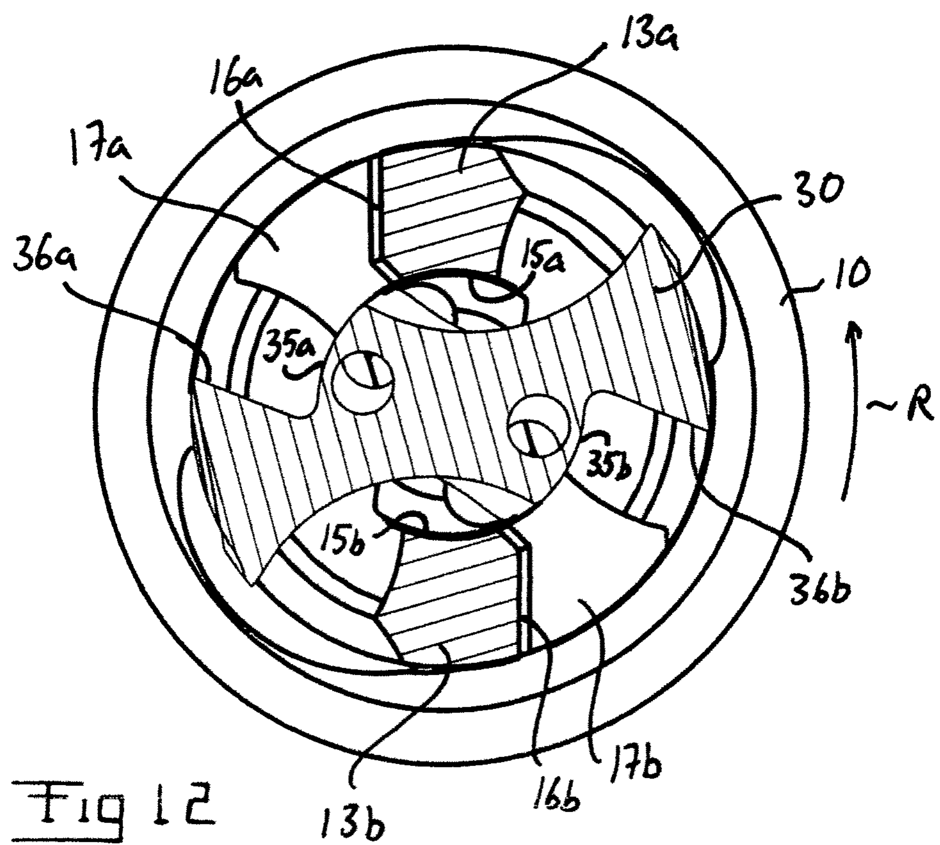

The replaceable cutting head 30 of the tool is shown in closer detail in FIGS. 8-10. The cutting head is symmetrically designed as seen in cross-section. At its front end, the cutting head has a cutting portion 40, which in a conventional manner comprises at least one cutting edge 41 extending in the radial direction of the cutting head. In the illustrated example, the cutting head 30 is provided with two cutting edges 41. Behind the respective cutting edge 41, as seen in the machining direction of rotation R of the cutting head, a clearance surface 42 is arranged. In the illustrated example, a coolant channel 43 opens into the respective clearance surface 42. At its other end, the respective coolant channel 43 opens into a bottom surface 44 on the underside of the cutting head. When the cutting head 30 is attached to the tool body 10, the respective coolant channel 43 is connected to a corresponding coolant channel 23 which extends through the tool body and which opens into a bottom surface 24 of the space 14 between the coupling legs 13*a*, 13*b* of the tool body (see FIG. 7). The distance in axial direction between the bottom surface 24 of the space 14 and the support surfaces 17*a*, 17*b* of the tool body is suitably somewhat larger than the distance in axial direction between the bottom surface 44 of the cutting head 30 and the support surfaces 37*a*, 37*b* of the cutting head, so that there is a small clearance between these bottom surfaces 24, 44 when the support surfaces 37*a*, 37*b* of the cutting head abut against the support surfaces 17*a*, 17*b* of the tool body, as illustrated in FIG. 4.

The above-mentioned coupling portion 32, which is designed for engagement with the coupling portion 12 of the tool body and receivable in the space 14 between the coupling legs 13*a*, 13*b* of the coupling portion of the tool body, is located below the cutting portion 40. External gripping surfaces 35*a*, 35*b* are arranged on the coupling portion 32 of the cutting head on either side of the centre axis of the cutting head. In the illustrated example, these gripping surfaces 35*a*, 35*b* are two in number. The external gripping surfaces 35*a*, 35*b* of the cutting head are designed for engagement with the corresponding internal gripping surfaces 15*a*, 15*b* in the space 14 of the coupling portion 12 of the tool body. Furthermore, the coupling portion 32 of the cutting head is provided with two stop surfaces 36*a*, 36*b* arranged on opposite sides of the centre axis of the cutting head, each of which being designed for abutment against the stop surface 16*a*, 16*b* of one of the coupling legs 13*a*, 13*b* of the coupling portion of the tool body. The external gripping surfaces 35*a*, 35*b* of the coupling portion of the cutting head are suitably arranged at the level of the stop surfaces 36*a*, 36*b* of the cutting head, as illustrated in FIGS. 8-10.

The respective stop surface 36*a*, 36*b* of the cutting head borders on a support surface 37*a*, 37*b* extending perpendicularly to the centre axis of the cutting head. These support surfaces 37*a*, 37*b* are designed for abutment against the corresponding support surfaces 17*a*, 17*b* of the coupling portion of the tool body. The respective stop surface 36*a*, 36*b* is parallel with the centre axis of the cutting head, and the stop surface 36*a*, 36*b* consequently extends perpendicularly to the support surface 37*a*, 37*b* bordering thereon.

The coupling portion 32 of the cutting head is turnable in the space 14 of the coupling portion 12 of the tool body about the centre axis of the cutting head to and fro between:

a free position (see FIG. 12), in which the stop surfaces 36*a*, 36*b* of the coupling portion of the cutting head do not abut against the corresponding stop surfaces 16*a*, 16*b* of the coupling legs 13*a*, 13*b* and the gripping surfaces 35*a*, 35 of the cutting head are not in holding engagement with the corresponding gripping surfaces 15*a*, 15*b* of the tool body; and an engagement position (see FIG. 11), in which the stop surfaces 36*a*, 36*b* of the coupling portion of the cutting head abut against the corresponding stop surfaces 16*a*, 16*b* of the coupling legs and the gripping surfaces 35*a*, 35*b* of the cutting head are in holding engagement with the corresponding gripping surfaces 15*a*, 15*b* of the tool body.

When the cutting head 30 is in said free position, the cutting head can be moved in axial direction away from the tool body 10, out of the space 14 between the coupling legs 13*a*, 13*b* of the tool body. When the cutting head 30 is in said engagement position, the cutting head is locked to the tool body 10 and the tool 1 is ready for machining of a workpiece. The turning of the cutting head 30 between the free position and the engagement position or vice versa is suitably performed by means of an implement in the form of a key of the like, which is brought into temporary engagement with the cutting head.

The internal gripping surfaces 15*a*, 15*b* of the coupling portion 12 of the tool body are cylindrical and arranged to extend in parallel with the centre axis C1 of the tool body. The corresponding external gripping surfaces 35*a*, 35*b* of the coupling portion of the cutting head are cylindrical and arranged to extend in parallel with the centre axis of the cutting head. These cylindrical external gripping surfaces 35*a*, 35*b* of the cutting head have a radius that is somewhat larger, preferably between 1-3% larger, than the radius of the cylindrical internal gripping surfaces 15*a*, 15*b* of the tool body, so that there will be a certain elastic deflection of the coupling legs 13*a*, 13*b* in radial direction when the coupling portion 32 of the cutting head is turned from the free position to the engagement position. Hereby, a stable mutual grip between the gripping surfaces is obtained. The cylindrical external gripping surfaces 35*a*, 35*b* of the cutting head and the cylindrical internal gripping surfaces 15*a*, 15*b* of the tool body are dimensioned so as to, by engagement with each other, prevent the cutting head 30 from being displaced in axial direction away from the tool body 10 when the cutting head is attached to the tool body. The cutting head 30 and the tool body lack axially acting holding means which by mutual positive locking prevents the cutting head 30 from being displaced in axial direction away from the tool body 10 when the cutting head is attached to the tool body. In the tool 1 according to the invention, such a holding of the mutually co-operating gripping surfaces 15*a*, 15*b*, 35*a*, 35*b* is achieved with a minor assistance from the frictional forces between the mutually co-operating stop surfaces 16*a*, 16*b*, 36*a*, 36*b*.

The respective stop surface 16*a*, 16*b* of the tool body is suitably so arranged that it has its extension in a plane which does not cross the centre axis C1 of the tool body, in which case the corresponding stop surface 36*a*, 36*b* of the cutting head consequently has its extension in a plane which does not cross the centre axis of the cutting head. As seen in a cross-section through the tool body 10 and the cutting head 30 (see FIG. 11), the lines of contact L1*a*, L1*b* between the respective stop surface 16*a*, 16*b* of the tool body and the corresponding stop surface 36*a*, 36 of the cutting head in this case extends at an angle in relation to a line L2 crossing the centre axis C1 of the tool body and the radial extreme points Pa, Pb of the lines of contact L1*a* and L1*b*, the distance between the respective line of contact L1*a*, L1*b* and the line L2 increasing in the direction towards the centre of the tool. Starting out from its radial extreme point Pa, Pb, the respective line of contact L1*a*, L1*b* is inclined forward in relation to the line L2 in the intended machining direction of rotation R of the tool. This results in that the cutting head 30 through the stop surfaces 36*a*, 36*b*, 16*a*, 16*b* will exert a force on the coupling legs 13*a*, 13*b* of the tool body directed towards the centre of the tool during machining of a workpiece, which in its turn results in that the internal gripping surfaces 15*a*, 15*b* of the coupling legs are pressed against the corresponding external gripping surfaces 35*a*, 35*b* of the cutting head. Hereby, the mutual holding between these gripping surfaces is consequently promoted. The angle between the line L2 and the respective line of contact L1*a*, L1*b* is suitably between 10-30°.

Two chip flutes 18 are arranged on the outside of the tool body and extend, preferably helically, diametrically opposite each other along the tool body 10 from an area in the vicinity of the attachment portion 11 and up to the coupling portion 12. Each one of these chip flutes 18 extends up to an area between the two coupling legs 13*a*, 13*b* and is arranged to connect to a corresponding chip flute 38 on the outside of the cutting head when the cutting head 30 is attached to the tool body 10. The chip flutes 18, 38 could alternatively be rectilinear instead of helical. The chip flutes 18, 38 are intended to carry away the chips generated by the cutting edges 41 during machining of a workpiece.

The cutting head 30 is provided with two guide edges 39*a*, 39*b* arranged diametrically opposite each other, which constitute the extreme surfaces of the cutting head in radial direction and which extend in the axial direction of the cutting head. During the drilling of a bore, the tool 1 abuts against the hole wall of the bore through these guide edges 39*a*, 39*b*, the guide edges guiding the tool 1 so that the bore will be straight and round. By arranging the gripping surfaces 35*a*, 35*b* of the cutting head at the level of its stop surfaces 36*a*, 36*b*, the cutting head 30 can be given a comparatively short extension in axial direction while maintaining a given length of the guide edges 39*a*, 39*b*, or the guide edges 39*a*, 39*b* can be given a comparatively long length while maintaining a given extension in axial direction of the cutting head.

If so considered suitable, the cutting head 30 can on its underside be provided with a centrally located guide pin 45 projecting in the axial direction of the cutting head, which guide pin is arranged to be received in a corresponding central recess 25 in the bottom of the space 14 between the coupling legs 13*a*, 13*b* when the coupling portion 32 of the cutting head is inserted into this space 14. Hereby, the initial centering of the coupling portion 32 of the cutting head in the space 14 is facilitated in connection with the mounting of the cutting head to the tool body. The guide pin 45 is suitably chamfered at its outer free end.

In order to facilitate the turning of the cutting head 30 from the free position to the engagement position, the coupling portion 32 of the cutting head is provided with two guide surfaces 48 arranged diametrically opposite each other, which extend in the axial direction of the cutting head. Each one of these guide surfaces 48 is formed by a chamfer in the transition between a chip flute 38 and the gripping surface 35*a*, 35*b* bordering on the chip flute, and follows the helical path of the chip flute. Guide surfaces 28 are likewise arranged on the respective coupling leg 13*a*, 13*b*, these guide surfaces 28 being formed by a chamfer in the transition between the stop surface 16*a*, 16*b* and the gripping surface 15*a*, 15*b* of the coupling legs 13*a*, 13*b*.

The invention is of course not in any way limited to the embodiments described above. On the contrary, several possibilities to modifications thereof should be apparent to a person skilled in the art without departing from the basic idea of the invention as defined in the appended claims.

The disclosures in Swedish patent application No. 0800834-4, from which this application claims priority, are incorporated herein by reference.

The invention claimed is:

1. A tool for rotary cutting machining, comprising a tool body and a replaceable cutting head detachably attachable to the tool body, wherein:

the tool body at its front end has a coupling portion with two coupling legs projecting in the axial direction of the tool body and arranged on opposite sides of the center axis of the tool body;

the cutting head has a coupling portion, which is designed for engagement with the coupling portion of the tool body and which is receivable in a space between the coupling legs of the coupling portion of the tool body;

internal gripping surfaces are arranged in the space of the coupling portion of the tool body, which are designed for engagement with corresponding external gripping surfaces of the coupling portion of the cutting head;

each coupling leg is provided with a respective stop surface intended to transfer torque from the tool body to the cutting head, each stop surface being designed for abutment against a corresponding stop surface of the coupling portion of the cutting head;

the coupling portion of the cutting head is turnable in the space of the coupling portion of the tool body about the center axis of the cutting head to and fro between a free position, in which the stop surfaces of the coupling portion of the cutting head do not abut against the corresponding stop surfaces of the coupling legs and the gripping surfaces of the cutting head are not in holding engagement with the corresponding gripping surfaces of the tool body, and an engagement position, in which the stop surfaces of the coupling portion of the cutting head abut against the corresponding stop surfaces of the coupling legs and the gripping surfaces of the cutting head are in holding engagement with the corresponding gripping surfaces of the tool body;

the internal gripping surfaces of the coupling portion of the tool body are cylindrical and extend in parallel with the center axis of the tool body;

the external gripping surfaces of the coupling portion of the cutting head are cylindrical, extend in parallel with the center axis of the cutting head and have a radius which is larger than the radius of the internal gripping surfaces, these cylindrical external gripping surfaces of the cutting head and the cylindrical internal gripping surfaces of the tool body being dimensioned so as to, by mutual engagement with each other, prevent the cutting, head from being displaced in axial direction away from the tool body when the coupling portion of the cutting head is in the engagement position in the space of the coupling portion of the tool body; and, in each coupling leg, the stop surface of the coupling leg extends in parallel with the center axis of the tool body, and the stop surfaces of the cutting head extend in parallel with the center axis of the cutting head.

2. A tool according to claim 1, wherein, in the respective coupling leg, the stop surface of the coupling leg borders on a support surface extending perpendicularly to the center axis of the tool body, which support surface is designed for abutment against a corresponding support surface of the coupling portion of the cutting head in order to carry axial forces.

3. A tool according to claim 1, wherein the internal gripping surfaces of the coupling portion of the tool body are arranged on the inside of a respective one of the coupling legs at the level of the stop surface of the coupling leg, and the external gripping surfaces of the coupling portion of the cutting head are arranged at the level of the stop surfaces of the cutting head.

4. A tool according to claim 1, wherein two chip flutes are arranged on the outside of the tool body and extend, preferably helically, diametrically opposite each other along the tool body, each one of these chip flutes extending up to an area between the two coupling legs and being arranged to connect to a corresponding chip flute on the outside of the cutting head when the coupling portion of the cutting head is in the engagement position in the space of the coupling portion of the tool body.

5. A tool body intended to be attached to a replaceable cutting head in order to form a tool for rotary cutting machining, wherein:

the tool body at its front end has a coupling portion with two coupling legs projecting in the axial direction of the tool body and arranged on opposite sides of the center axis of the tool body, and a space arranged between these coupling legs designed for receiving a coupling portion of the cutting head;

internal gripping surfaces are arranged in the space of the coupling portion of the tool body;

each coupling leg is provided with a stop surface intended to transfer torque from the tool body to the cutting head, stop surface being designed for abutment against a corresponding stop surface of the coupling portion of the cutting head;

the internal gripping surfaces of the coupling portion of the tool body are cylindrical, extend in parallel with the center axis of the tool body and have a radius which is smaller than the radius of corresponding cylindrical external gripping surfaces of the coupling portion of the cutting head, these cylindrical internal gripping surfaces being dimensioned so as to, by engagement with the corresponding cylindrical external gripping surfaces of the coupling portion of the cutting head, prevent the cutting head from being displaced in axial direction away from the tool body when the tool body is attached to the cutting head, and in the respective coupling leg, the stop surface of the coupling leg extends in parallel with the center axis of the tool body.

6. A tool body according to claim 5, wherein, in the respective coupling leg, the stop surface of the coupling leg borders on a support surface extending perpendicularly to the center axis of the tool body, which support surface is designed for abutment against a corresponding support surface of the coupling portion of the cutting head in order to carry axial forces.

7. A tool body according to claim 6, wherein the internal gripping surfaces of the coupling portion of the tool body are arranged on the inside of a respective one of the coupling legs at the level of the stop surface of the coupling leg.

8. A tool body according to claim 5, wherein, in the respective coupling leg, the stop surface of the coupling leg borders on a support surface extending perpendicularly to the center axis of the tool body, which support surface is designed for abutment against a corresponding support surface of the coupling portion of the cutting head in order to carry axial forces.

9. A tool body according to claim 8, wherein the internal gripping surfaces of the coupling portion of the tool body are arranged on the inside of a respective one of the coupling legs at the level of the stop surface of the coupling leg.

10. A cutting head detachably attachable to a tool body according to claim 5, wherein:

the cutting head has a coupling portion, which is designed for engagement with the coupling portion of the tool body and which is receivable in the space between the coupling legs of the coupling portion of the tool body;

external gripping surfaces are arranged on the coupling portion of the cutting head;

the coupling portion of the cutting head is provided with two stop surfaces arranged on opposite sides of the center axis of the cutting head, each of which being designed for abutment against the stop surface of one of the coupling legs of the coupling portion of the toot body;

the external gripping surfaces of the coupling portion of the cutting head are cylindrical, extend in parallel with the center axis of the cutting head and have a radius which is larger than the radius of the corresponding cylindrical external gripping surfaces of the coupling portion of the tool body, these cylindrical external gripping surfaces being designed to prevent, by engagement with the corresponding cylindrical internal gripping surfaces of the coupling portion of the tool body, the cutting head from being displaced in axial direction away from the tool body when the cutting head is attached to the tool body, and the stop surfaces of the cutting head extend in parallel with the center axis of the cutting head.

11. A cutting head according to claim 10, wherein the external gripping surfaces of the coupling portion of the cutting head are arranged at the level of the stop surfaces of the cutting head.

12. A cutting head according to claim 11, wherein the respective stop surface of the coupling portion of the cutting head borders on a support surface of the coupling portion of the cutting head extending perpendicularly to the center axis of the cutting head, which support surface is designed for abutment against a corresponding support surface of the coupling portion of the tool body in order to transfer axial forces.

13. A cutting head according to claim 10, wherein the external gripping surfaces of the coupling portion of the cutting head are arranged at the level of the stop surfaces of the cutting head.

14. A cutting head according to claim 13, wherein the respective stop surface of the coupling portion of the cutting head borders on a support surface of the coupling portion of the cutting head extending perpendicularly to the center axis of the cutting head, which support surface is designed for abutment against a corresponding support surface of the coupling portion of the tool body in order to transfer axial forces.

* * * * *